United States Patent
Johnson et al.

(10) Patent No.: US 8,174,136 B2
(45) Date of Patent: May 8, 2012

(54) ADAPTIVE PITCH CONTROL FOR VARIABLE SPEED WIND TURBINES

(75) Inventors: Kathryn E. Johnson, Boulder, CO (US); Lee Jay Fingersh, Westminster, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 551 days.

(21) Appl. No.: 11/816,455

(22) PCT Filed: Apr. 26, 2006

(86) PCT No.: PCT/US2006/016284
§ 371 (c)(1),
(2), (4) Date: Jul. 1, 2009

(87) PCT Pub. No.: WO2007/123552
PCT Pub. Date: Nov. 1, 2007

(65) Prior Publication Data
US 2009/0295159 A1    Dec. 3, 2009

(51) Int. Cl.
*F03D 9/00* (2006.01)
*H02P 9/04* (2006.01)

(52) U.S. Cl. .......................................... 290/44

(58) Field of Classification Search ............. 290/44, 290/55; 416/147, 61, 48; 700/287, 286, 700/290, 28, 289
See application file for complete search history.

(56) References Cited

U.S. PATENT DOCUMENTS

| | | |
|---|---|---|
| 4,160,170 A | 7/1979 | Harner et al. |
| 4,331,881 A | 5/1982 | Soderholm et al. |
| 4,656,362 A | 4/1987 | Harner et al. |
| 5,155,375 A | 10/1992 | Holley |
| 5,798,631 A | 8/1998 | Spee et al. |
| 6,137,187 A | 10/2000 | Mikhail et al. |
| 6,320,272 B1 | 11/2001 | Lading et al. |
| 6,320,273 B1 | 11/2001 | Nemec |
| 6,327,957 B1 | 12/2001 | Carter, Sr. |
| 6,856,039 B2 | 2/2005 | Mikhail et al. |
| 6,933,625 B2 | 8/2005 | Feddersen et al. |
| 2004/0119292 A1 | 6/2004 | Datta et al. |
| 2005/0012339 A1 | 1/2005 | Mikhail et al. |
| 2005/0019163 A1 | 1/2005 | Heronemus |

(Continued)

OTHER PUBLICATIONS

Johnson et al., "Methods for Increasing Region 2 Power Capture on a Variable Speed HAWT", AIAA-2004-0350.

(Continued)

*Primary Examiner* — Julio Gonzalez
(74) *Attorney, Agent, or Firm* — W. LaNelle Owens; John C. Stolpa; Paul J. White

(57) ABSTRACT

An adaptive method for adjusting blade pitch angle, and controllers implementing such a method, for achieving higher power coefficients. Average power coefficients are determined for first and second periods of operation for the wind turbine. When the average power coefficient for the second time period is larger than for the first, a pitch increment, which may be generated based on the power coefficients, is added (or the sign is retained) to the nominal pitch angle value for the wind turbine. When the average power coefficient for the second time period is less than for the first, the pitch increment is subtracted (or the sign is changed). A control signal is generated based on the adapted pitch angle value and sent to blade pitch actuators that act to change the pitch angle of the wind turbine to the new or modified pitch angle setting, and this process is iteratively performed.

17 Claims, 4 Drawing Sheets

U.S. PATENT DOCUMENTS

| | | | |
|---|---|---|---|
| 2005/0082839 A1 | 4/2005 | McCoin | |
| 2010/0090464 A1* | 4/2010 | Egedal | 290/44 |
| 2010/0301606 A1* | 12/2010 | Hashimoto et al. | 290/44 |
| 2011/0158805 A1* | 6/2011 | Miranda et al. | 416/1 |
| 2011/0193343 A1* | 8/2011 | Nakashima et al. | 290/44 |

OTHER PUBLICATIONS

Lee et al., "Compliant Blades for Wind Turbines", IPENZ Transactions, 1999, vol. 26, No. 1/EMCb.

Mullane et al., "Adaptive Control of Variable Speed Wind Turbines", University College Park.

Muljadi et al., "Pitch-Controlled Variable-Speed Wind Turbine Generation", NREL Disclosure 1999 IEEE Industry Applications Society Annual Meeting Oct. 3-7, 1999.

Stol, "Disturbance Tracking and Blade Load Control of Wind Turbines in Variable-Speed Operation", NREL 2003, AIAA/ASME Wind Symposium, Reno Nevada, Jan. 6-9, 2003.

Hand et al., "Advanced Control Design and Field Testing for Wind Turbines at the National Renewable Energy Laboratory", World Renewable Energy Congress VIII, Denver, Colorado, Aug. 29-Sep. 3, 2004.

Fingersh, L. J. et al, "Controls advanced research turbine (CART) Commissioning and Baseline Data Collection", 2002.

Fingersh, L.J. et al, "Baseline Results and Future Plans for the NREL Controls Advanced Research Turbine" Proceedings of the 23rd ASME Wind Energy, Reno, NV pp. 87-93, Nov. 2003.

Hand, M. et al, "Advanced Control Design and Field Testing for Wind Turbines at the National Renewable Energy Laboratory" Proceedings of the World Renewable Energy Congress VIII, 2004, Denver, CO.

Johnson, K.E. et al, "Methods for Increasing Region 2 Power Capture on a Variable Speed HAWT" Proceedings of the 23rd ASME Wind Energy Symposium, 2004, Reno, NV pp. 103-113.

Johnson, K.E. et al, "Adaptive Torque Control of Variable Speed Wind Turbines" PhD Thesis, University of CO, Boulder, CO.

Johnson, K.E. et al, "Methods for Increasing Region 2 Power Capture on a Variable Speed Wind Turbine" Journal of Solar Energy Engineering, vol. 126, No. 4, pp. 1092-1100, Nov. 2004.

Johnson, K.E. et al, "Stability Analysis of an Adaptive Torque Controller for Variable Speed Wind Turbines", Dec. 2004.

Johnson, K. et al, "Adaptive Torque Control of Variable Speed Wind Turbines for Increased Region 2 Energy Capture" Proceedings of the 2005 ASME Wind Energy Symposium, pp. 66-76.

Stol, K.A. Dynamics Modeling and Periodic Control of Horizontal-Axis Wind Turbines, PhD Thesis, University of Colorado, Boulder, CO, 1998.

Stol, K.A. "Periodic disturbance accommodating control for blade load mitigation in wind turbines" Journal of Solar Energy Engineering, vol. 125, pp. 379-385, Nov. 2003.

Stol, K.A. "Disturbance tracking control and blade load mitigation for variable-speed wind turbines" Journal of Solar Energy Engineering, vol. 125, pp. 396-401, Nov. 2003.

* cited by examiner

ADAPTIVE PITCH CONTROL FOR VARIABLE SPEED WIND TURBINES

CONTRACTUAL ORIGIN

The United States Government has rights in this invention under Contract No. DE-AC36-99GO10337 between the United States Department of Energy and the National Renewable Energy Laboratory, a Division of the Midwest Research Institute.

BACKGROUND

Wind energy is increasingly recognized as a viable option for complementing and even replacing other types of energy such as fossil fuels. In the early development of wind energy, the majority of wind turbines or wind turbine generators (WTGs) were constructed for operation at a constant speed, but more recently, the trend is toward sing variable-speed wind turbines to better capture available wind power. In most cases, wind turbine pitch angles can be adjusted to control the operation of the variable speed wind turbine.

Wind turbine manufacturers use variable-speed turbines to capture available wind power over a wide range of wind speeds. To be effective, though, these variable speed wind turbines require active control systems to react to changing wind and other operating conditions. One concept that is fundamental to the control dynamics for a wind generator is that changing speed is a relatively slow process due to the large inertia values involved, and this makes it difficult to use a power converter in the turbine or in the turbine's "plant" to control the rotor speed. As a result, manufacturers and operators of variable speed wind turbines also use pitch control on an ongoing basis to regulate power flow at the high speed limit. In other words, a control system is used to vary pitch rapidly in response to rotor speed, and significant efforts have been made to improve this ongoing pitch control system.

Manufacturers and operators of wind turbines are also interested in setting a "nominal" pitch for wind turbines to allow the wind turbine to better capture available wind power when operating below rated speed and power. The nominal pitch can be thought of as a default set point to which the blades of a variable speed wind turbine are adjusted in order for the wind turbine to operate generally at a high efficiency. The control system may then vary the pitch of the blades from this nominal pitch in a relatively rapid manner to control power generation in response to wind gusts and other more rapid wind variations. Models have been generated by designers of wind turbines that predict the performance of wind turbines having particular blade configurations, and these models have been used to predict an optimal pitch for use as the nominal pitch for the wind turbine. Typically, the operator will then set this pitch with the control system as the nominal pitch. Some work has been performed to provide adaptive control of torque gain, but that work has assumed a particular nominal pitch.

Existing methods of selecting the nominal pitch for variable wind speed turbines have not been entirely effective. The models that have been used to predict wind turbine behavior have been shown by operating data and experimental results to be at least partially inaccurate, e.g., the models do not predict actual operating conditions and power generation results for most wind turbines. These inaccuracies may result in the nominal pitch being set too high or too low, which results in less than optimal capture of the available wind power. Additionally, the predictive models are useful for predicting operating parameters for a wind turbine based on design parameters. However, the installed wind turbine may not match the design parameters and its operating parameters likely will vary over time, such as due to pitting of the blades, due to weight variances of the blades (e.g., due to condensation or the like within the blades), due to variances in the generator components, or due to other operating conditions that change over time and in response to physical conditions. Further, tolerances in sensors and controls may affect actual operating results, e.g., a sensor or blade actuator indicating a particular pitch for a blade may be inaccurate which may result in the blade being set at a pitch that varies from the control setting.

Due to these ongoing challenges with controlling pitch of wind turbine blades, there remains a need for improved methods and systems for adaptively controlling pitch of blades in variable speed wind turbines. Preferably, such methods and systems would be configured for implementation with existing plant or generator control systems, e.g., to utilize existing wind speed, rotor speed, mechanical power generated, and other operating parameter sensors and signals and existing plant or turbine control systems including blade pitch actuators.

The foregoing examples of the related art and related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements. This is achieved, in part, by providing an adaptive control method for adjusting the pitch of blades in a wind turbine or turbine system. Compared to a standard controller the use of such an adaptive controller is expected to enable the wind turbine to produce more power at below-rated wind speeds. For example, increases of up to 5 percent or more in captured power and energy production are anticipated for a typical variable speed wind turbine that implements the adaptive blade pitch control method.

More particularly, an adaptive control method is provided for use with variable speed wind turbines to adjust pitch so as to better capture available wind power. The method includes determining captured power for a period of time (such as for an adaptation time period) for an operating wind turbine. For this period of time, the wind power available is also determined, and then, the power coefficient is determined based on the ratio of captured power to the available wind power. Typically, the wind power available and the captured power are determined as averages over the operating period. The method continues with generating a pitch signal for use in setting a pitch of one or more blades in the wind turbine by modifying an existing pitch setting by a pitch increment. Then, the captured power and available wind power are determined for a next or second time period (i.e., after the pitch has been changed based on the pitch signal). A power coefficient is determined for this second time period and is compared to the earlier power coefficient.

Based on this comparison, the next pitch signal is generated to set the blades to a new pitch angle that differs from the existing pitch angle by a next or second pitch increment. More specifically, if the power coefficient is increasing (i.e., the second power coefficient is larger than the first power coefficient), a sign of the prior pitch increment is retained and a next pitch increment is added to the existing pitch angle. If the power coefficient is decreasing, the sign of the pitch increment is changed prior to it being added to the existing pitch angle for the blades. The process continues with a next power coefficient being determined after another adaptation time period has lapsed and further modifying the pitch angle by a pitch increment (e.g., having a positive or negative sign).

The method may further include determining a function relating torque gain to pitch angle based on model predictions, and then, modifying the existing torque gain value based on the determined function and the pitch angle of the wind turbine. Alternatively, the method may include making an incremental change to torque gain after the generation of the next pitch signal based, with the direction of the incremental change being based on recently determined power coefficients.

According to another embodiment, a method is provided for adaptively controlling the pitch of blades in a variable speed wind turbine. The method includes providing a pitch increment for use in modifying a nominal pitch value for a wind turbine. Average power coefficients are determined for a first period of operation for the wind turbine and for a later second period of operation. When the average power coefficient for the second time period is larger than for the first time period, the method includes adding the pitch increment of the same sign as the previous pitch increment to the nominal pitch value for the wind turbine. Then, typically, a control signal is generated based on this modified nominal pitch value and sent to the pitch position or blade pitch actuators that act to change the pitch of the wind turbine blades to the new or modified blade pitch. The method also includes when the average power coefficient for the second time period is less than for the first time period, adding the pitch increment of the opposite sign of the previous pitch increment to the nominal pitch value (and, typically, then generating a pitch control signal that is transmitted to the wind turbine plant to cause adjustment of the blades). These adaptive control steps are then repeated for each next adaptive time period (e.g., for a time period selected from the range of 1 to 100 hours or selected to be less than 12 hours and often selected in the range of 3 to 6 hours).

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DESCRIPTION

Figure 1:
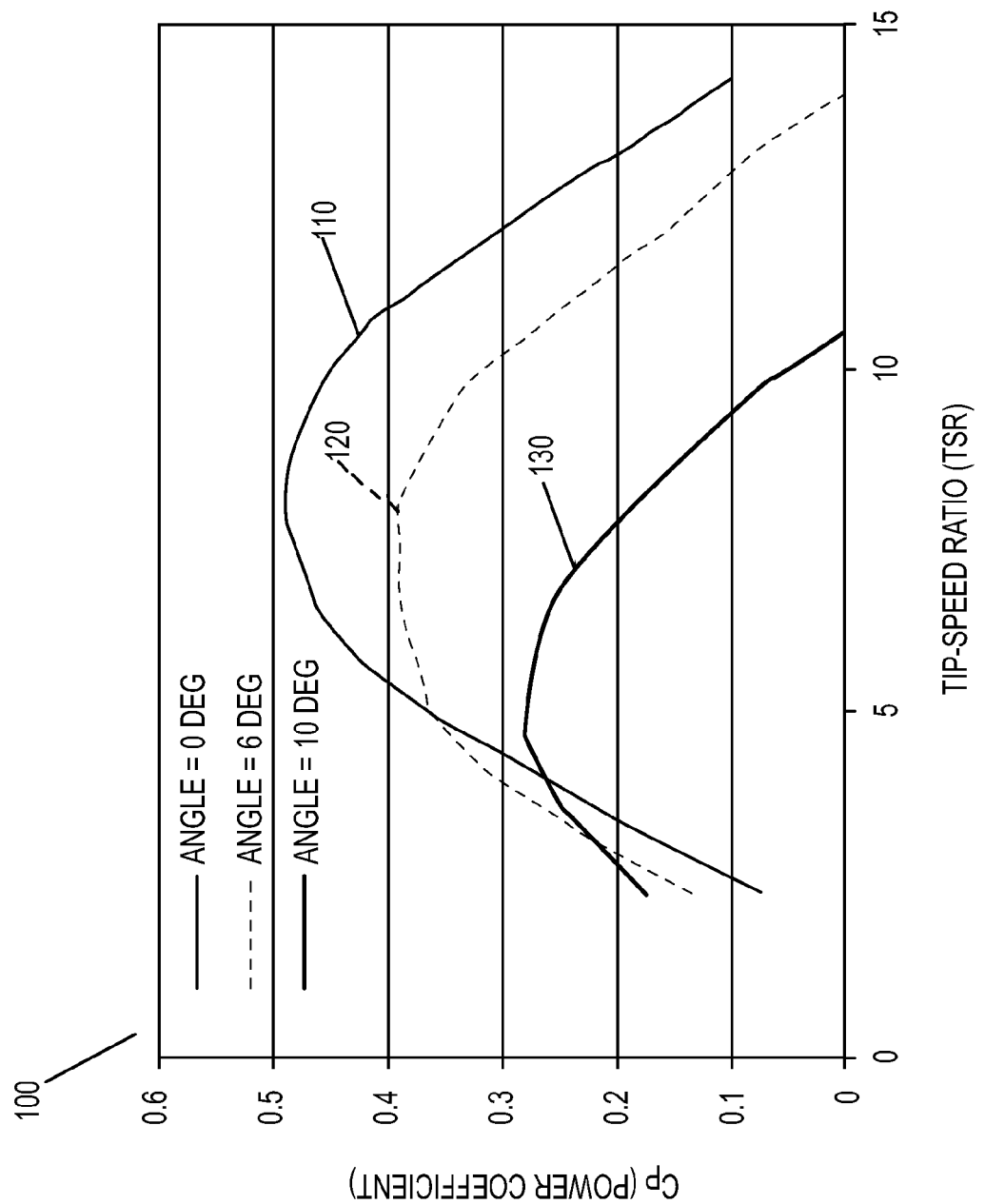
FIG. 1 is a graph of power coefficient versus tip-speed ratio for varying pitch angles within a wind turbine.

An adaptive method is described herein for controlling wind turbine pitch and control systems and wind turbines incorporating such an adaptive method. Generally, wind turbine control includes using a computer(s) or a computer device(s) that are mounted in or near the wind turbine (or turbine plant) to monitor turbine-mounted or other nearby sensors and then, activating one or more turbine-mounted actuators (such as an actuator for adjusting pitch of one or more of the turbine blades). The turbine-mounted sensors may include, for example, torque transducers, pressure transducers, power transducers, encoders, thermometers, accelerometers, strain gauges, deflection sensors, wind speed and direction sensors, and other similar devices useful for measuring and/or determining such operating parameters as rotor speed, mechanical torque or power generation, available wind power, and existing blade pitch angles. The turbine actuators typically include blade pitch actuators, yaw motors, brakes and torque control implemented through active power electronic control of the generator. The turbine-mounted sensors and turbine actuators along with computer (e.g., processing components, memory, and software applications) and communication components may generally all be thought of as part of the control system for a variable speed wind turbine in the following description.

The adaptive control method of several embodiments pertains to increasing the energy captured by a variable speed wind turbine by adaptively controlling the blade pitch angle. Briefly, the pitch angle is incremented or decremented in small steps based on measured changes in captured power compared to available wind power. Such incrementing or decrementing is typically performed periodically, such as a period ranging from 3 to 6 hours but other shorter or longer periods (or pitch adaptation time periods) may be used to practice the adaptive control method. The method is continued with additional power measurements and additional changes in pitch angle or blade pitch until eventually the "optimal" pitch angle for energy capture is achieved.

However, the "optimal" point varies over time and hence, the method is typically continued over the operating life of the wind turbine to continue to adapt to changing operating conditions and physical characteristics of the plant, blades, or other components of the wind turbine.

In certain embodiments, the adaptive pitch control techniques are combined with other advanced controllers and control techniques. For example, an embodiment comprises combining previously developed adaptive torque gain control with the adaptive pitch control described herein to create a new, more effective turbine control. The adaptive torque gain control is achieved in a manner that is similar to that of the adaptive pitch control method or controller by incrementing or decrementing the adaptive torque gain in response to changes in the ratio of captured power to available power. As discussed in detail below, these two adaptive controllers may be operated concurrently or serially in order to increase the total energy capture (e.g., to operate the wind turbine at a desired optimal point).

Further, any loads controller, state space controller (e.g., disturbance tracking control), or other controller (such as but certainly not limited to controllers that operate by using a fixed pitch set point with small pitch oscillations for control of other parameters) can be augmented with the adaptive pitch control method, with adaptive controllers implementing the adaptive pitch control method providing the "nominal" pitch angle while the other controller is providing load or other control in the turbine as desired. In most embodiments, the pitch control method is used to control the pitch of all blades of a wind turbine (i.e., all blades have a single pitch angle setting), but the pitch control method described herein is also useful in wind turbines that use independent blade pitch controllers with the adaptive control being applied to each blade of the wind turbine.

The following discussion begins with a general description of wind turbines including how they are typically controlled using control or gain signals and what parameters are optimized or controlled. The discussion then proceeds to a more specific discussion of adaptive pitch control methods and associated systems.

A wind turbine can be described by the following simple relationship:

$$J_T \dot{\Omega} = Q_A - Q_E$$

where $J_T$ is rotor inertia (kg·m$^2$), $\Omega$ is rotor angular speed (rad/s), $\dot{\Omega}$ is the first derivative of $\Omega$ with respect to time, d/dt, $Q_A$ is aerodynamic torque (N·m), and $Q_E$ is generator torque (N·m).

Basically, rotor rotation in a wind turbine is a balance between the aerodynamic torque applied by the wind and the electrical torque applied by the generator. The power coefficient, $C_P$, for a wind turbine is a measure of the mechanical power delivered by the rotor to the turbine's low speed shaft, and it is frequently defined as the ratio of the mechanical power to the power available in the wind:

$$C_P = (Q_A \Omega)/(\tfrac{1}{2}\rho A W^3) = P/P_{wind}$$

where $\rho$ is air density (kg/m$^3$), A is rotor swept area (m$^2$), W is wind speed (m/s), P is mechanical power delivered to rotor (or captured power, $P_{cap}$) (Watts), and $P_{wind}$ is power available in the wind (Watts). The mechanical power produced by a rotor is a function of the geometry and the incident velocity. The design parameters that affect aerodynamic performance include blade pitch (or angle of attack), taper, twist distribution, and airfoil selection with the last three parameters usually being fixed, thereby leaving pitch as a parameter that can be adaptively controlled to enhance the power coefficient for a wind turbine. The power coefficient for any fixed rotor geometry is a function of the blade tip speed ratio (i.e., ratio of blade tip speed to wind speed) with a single maximum value. The torque produced by the rotor can be controlled in two ways: (1) by changing the geometry by varying the blade pitch angle and/or (2) by changing the rotor's rotational speed so the rotor operates at the optimal tip speed ratio.

The adaptive control methods described herein are preferably implemented in wind turbines or wind turbine systems that implement control systems that include servo-electric motors or other devices that actuate blade pitch angles to attain blade pitch angles that are typically commanded collectively but in some cases may be commanded independently. Further, it is preferable that the control system be useful for providing precise control of generator torque to permit accurate and effective variable speed operation for the wind turbine. Finally, it is preferred that the wind turbine includes instrumentation (sensors and the like) to allow adaptive control for optimization and for changing turbine and operating conditions.

When the wind turbine operates at variable rotational speeds, a standard control algorithm that may be implemented by the control system of the wind turbine system typically calls for generator torque to be commanded according to the following:

$$Q_E = k\Omega^2 \text{ where } k = \tfrac{1}{2}(\rho A R^3)(C_{PMAX}/\lambda^{*3})$$

where k is torque control gain, R is turbine radius (m), $C_{PMAX}$ is the maximum rotor power coefficient, and $\lambda^*$ is tip speed ratio at maximum power coefficient. The value of k is often derived from performance code simulations, but in some embodiments, the value of k (or more specifically the adaptive torque control gain, M, which is equal to k/$\rho$ (i.e., k=$\rho$M)) is determined adaptively. Ideally, commanding the rotor speed along this trajectory by the control system yields maximum power coefficient for all wind speeds.

However, experimental results using this control algorithm based on data obtained from operating wind turbines has shown that the ideal situation is generally not achievable in real-world implementations. For example, the variability in the wind speed causes the turbine to operate at tip speed ratios other than the optimal value because the large magnitude rotor inertia causes the turbine to track wind variation rather slowly. As a result, the turbine is controlled to spend much of its time attempting to regain the optimum speed ratio.

As can be seen from this discussion, a wind turbine can be characterized by its $C_P$–TSR (power coefficient–tip speed ratio) curve, as can be seen from the graph 100 of FIG. 1. As shown, the $C_P$–TSR curves 110, 120, 130 are provided for three differing pitch angles, i.e., for 0 degree, 6 degree, and 10 degree pitches or pitch angles for the wind turbine blades. The tip-speed ratio is the ratio between the linear speed of the tip of the blade with respect to the wind speed. It is seen in the graph 100 that the power coefficient $C_P$ varies with the tip-speed ratio and, more significant, with the pitch angle. Typically, the pitch angle is controlled to allow the wind turbine to operate with a higher power coefficient, but the pitch angle can be increased to shed some of the aerodynamic power in high wind speed conditions.

Figure 2:
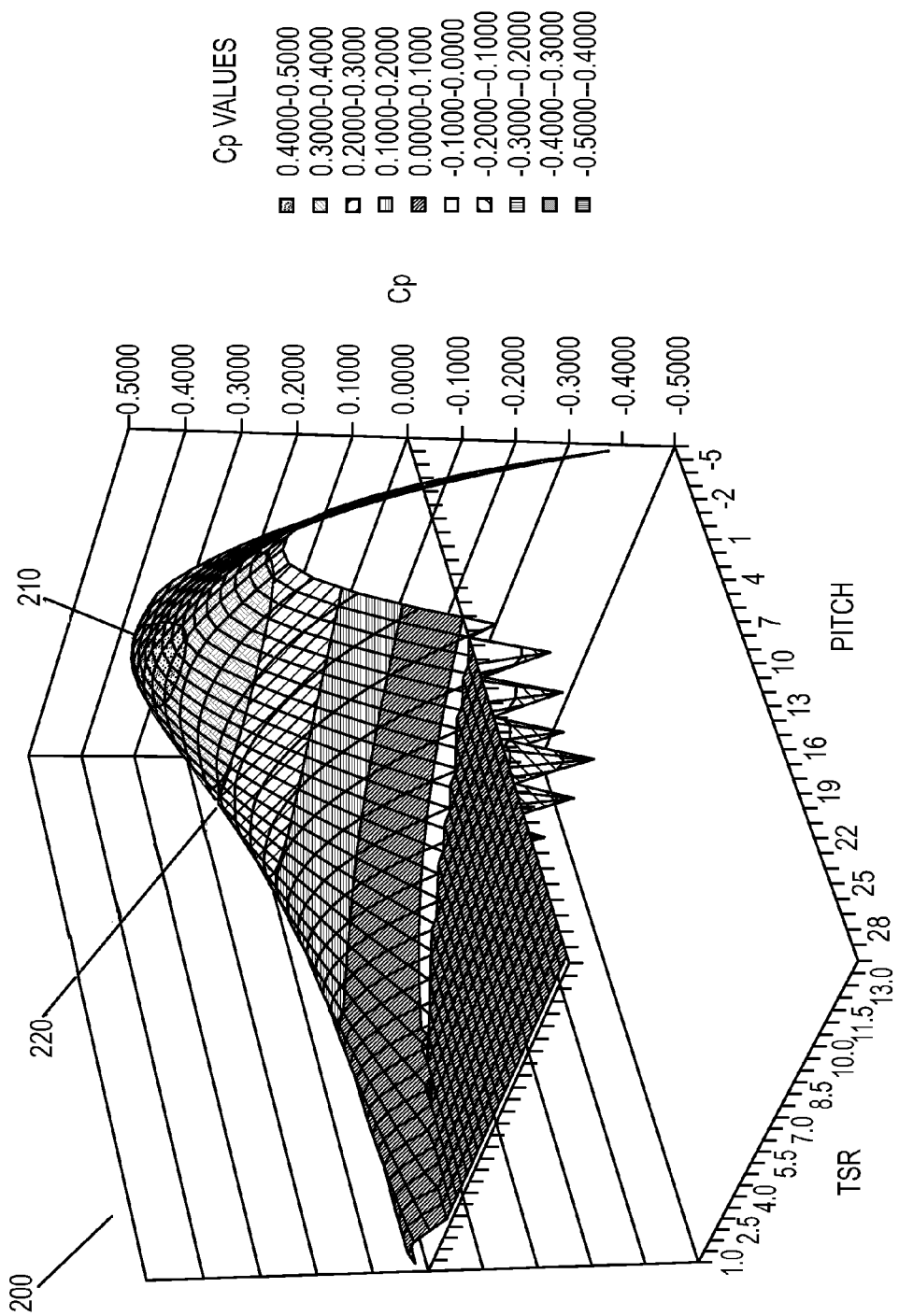
FIG. 2 is a graph of power coefficient versus tip-speed ratio and pitch angle for a representative wind turbine configuration.

Since the power coefficient varies with two variables, it is useful to graph the power coefficient simultaneously versus both tip-speed ratio and pitch. A representative graph 200 of these three variables is shown in FIG. 2 for an exemplary wind turbine with particular blade configuration, and it will be understood that each wind turbine can be modeled in a similar manner to create a-graph similar to graph 200. The graph 200 is generated from a predictive model (or modeling algorithm) for variable speed wind turbines. To operate a wind turbine for optimum or more efficient power capture, it is preferable to maximize the power coefficient. For the modeled wind turbine of the graph 200, the optimal operating region is shown by the peak (or optimal power coefficient) or peak region 210 (e.g., a region for the wind turbine with $C_P$ values of 0.4000 to 0.5000). Previously, a model similar to graph 200 would have been used to predict a nominal pitch for use with the wind turbine modeled by graph 200. However, as discussed above, the predictive model does not always accurately represent the results obtained by an operating wind turbine. Hence, by selecting an incorrect or non-optimized pitch angle, the wind generator may be operated outside of the optimal region 210 such as in the adjacent region 220 (e.g., a region with $C_P$ values of 0.3000 to 0.4000), which results in a less desirable power coefficient being achieved by the wind turbine.

Figure 3:
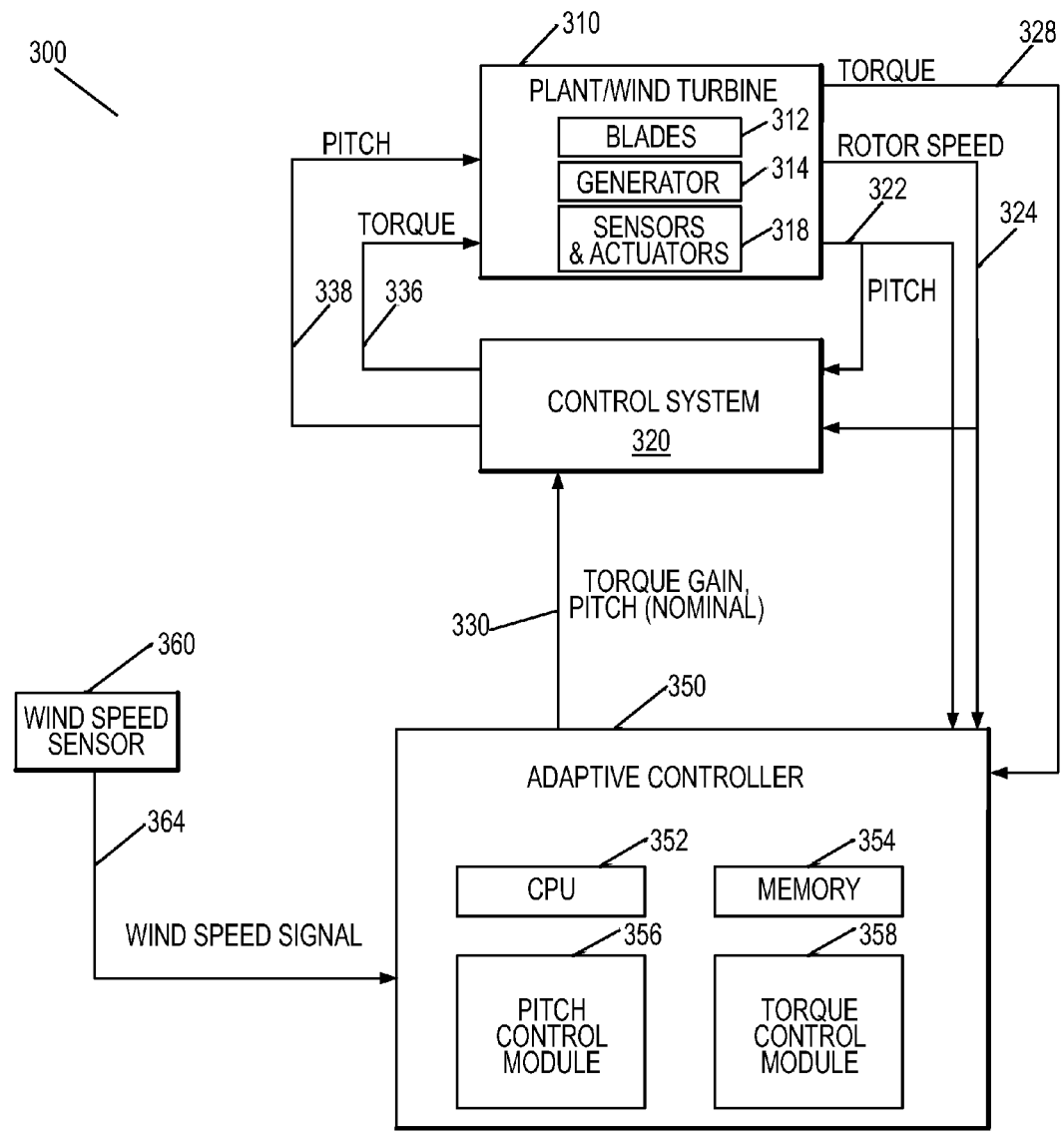
FIG. 3 illustrates in block form a wind turbine system including an adaptive controller with an adaptive pitch control module.

FIG. 3 illustrates in simplified block form a wind turbine system 300 that is configured to provide adaptive pitch control. As shown, the system 300 includes a wind turbine or plant 310, which would typically include the specified and other components that are stationed in the field to capture wind power. The plant 310 is shown as including at least blades 312 that are set at a particular pitch or pitch angle and are attached by a rotor (not shown) to a generator 314, which converts mechanical power from the blades 312 and rotor into electrical power. Also, a set of control components 318 are shown mounted on the turbine or provided at or near the plant 310 to sense operating parameters with sensors or the like and to affect a desired operational setting or physical characteristic of the plant 310 and its components, e.g., actuators for setting blade pitch and devices for setting torque. As discussed above, the sensors and actuators 318 may include (but are not limited to) torque transducers, pressure transducers, power transducers, encoders, thermometers, accelerometers, strain gauges, deflection sensors, wind speed and direction sensors, blade pitch actuators, yaw motors, brakes, and torque control implemented through active power electronic control on the generator, and other similar devices.

A control system 320 is provided in the system 300, such as in or near the plant 310 structure. The control system 320 typically will include a processor, memory, and software applications or modules for processing signals from sensors 318 and from adaptive controller 350 and to response by generating control signals 336, 338 to the plant or wind turbine 310 components to control its operation. For example, the control system 320 issues control signals 338 to control the pitch of blades 312 with blade pitch actuator(s) 318 (or a servo or other similar system) and issues torque control signals 336 to control operation of generator 314. The control system 330 receives as input signals from sensors 318 indicating (at least) pitch 322 and rotor speed 324. The control system 330 further receives a pitch signal or setting information 330 from the adaptive controller 350 that is used by the control system 320 in generating the pitch control signal 338 (i.e., to set the nominal position of the blades 312). Typically, the adaptive controller 350 also provides in the signal 330 a torque gain value that is used by the control system 320 in generating the torque control signal 336 that controls operation of the generator 314. The particular control system 320 utilized in the system 300 is not limiting and many are well-known in the art. It is more significant how the input signal 330 is generated by the adaptive controller 350. However, the adaptive controller 350 is useful with a Westinghouse WTG-600 and its control system, with such a system used for testing at the National Renewable Energy Laboratory (NREL) in Golden, Colo. and labeled the Controls Advanced Research Turbine (CART).

The adaptive controller 350 is typically a personal computer or similar device(s) that includes a processor 352 and memory 354 for storing received data from sensors and for storing a code run by processor 352. Particularly, the adaptive controller 350 includes a pitch control module 356 run by processor 352 for periodically generating the pitch signals (or pitch control information) 330 that is transmitted to the control system 320 for controlling pitch of blades 312 via signals 338. As will become clear, the pitch control module 356 generates the pitch signals 330 based on wind speed determined from signals 364 from wind speed sensor or speed measurement device 360 (i.e., based on the wind power available, $P_{wind}$), from rotor speed, $\omega$ or $\Omega$, 324, from generator torque, $Q_E$ or $\tau_c$, 328 as measured by actuators 318 (i.e., based on captured power, $P_{cap}$), and from measured pitch, $\beta_{measured}$. The adaptive pitch control algorithm is explained in more detail below with reference to FIG. 4. The sensor signals received by the adaptive controller 350 are typically received as digital signals or are converted by the adaptive controller 350 from analog signals, e.g., a pitch position transducer 318 may provide an analog signal that is proportional to the blade pitch position that is later converted to digital to identify the existing or current angular position of the blades 312.

The adaptive controller 350 also is shown to include a torque control module 358 that may be used to process the signals 324, 328, and 364 to produce a torque gain, M, signal 330 for transmission to the control system 320 for use in generating the torque control signal 336 provided to the generator 314 (or its control mechanisms 318). The operation of torque control module 358 is explained in detail below as it may be operated independently or concurrently or serially with the pitch control module 356 to more effectively control the wind turbine 310 via signal 330. The adaptive controller 350 is shown as a separate component in the system 300 of FIG. 3, but, in some embodiments, the adaptive controller 350 may be provided as a part of the control system 320 or other system components.

Figure 4:
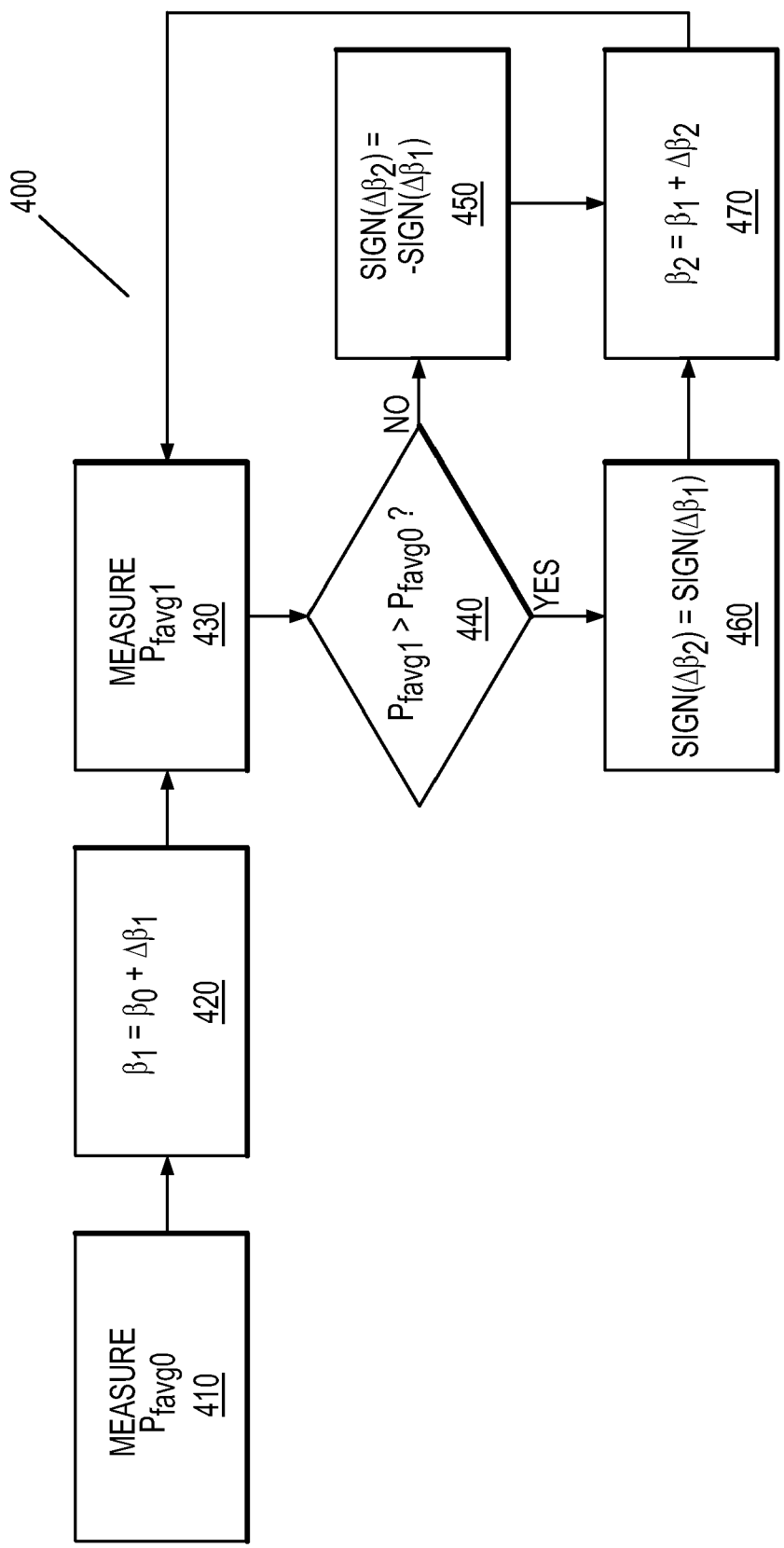
FIG. 4 is a flow diagram of the steps or processes performed by the pitch control module, such as the pitch control module of the system of FIG. 3.

In FIG. 4, an adaptive method for controlling blade pitch 400 is illustrated, and this or similar methods typically is implemented in the system 300 with the pitch control module 356 and operation of the adaptive controller 350. At 410, the control method 400 begins with measuring and/or determining the average power coefficient, $P_{favg}$, for an adaptation period or increment. The adaptation period may be very short or relatively long, e.g., from minutes to many hours, but in typical embodiments, a period selected from the range of 3 to 6 hours is useful to practice the method 400. The average power coefficient is typically determined by finding the ratio of the mean of the power captured or delivered to the rotor of the generator and the mean of the wind power available, i.e., $P_{favg}$=mean($P_{cap}$)/mean($P_{wind}$), which is based on signals from sensors in the plant and wind speed measuring device (e.g., see signals 324, 328, and 364 in FIG. 3).

The measurement of the power coefficient does not have to be accurate. It just has to be correlated with the true power coefficient, and the measurement itself should not be strongly dependent on pitch angle. For example, the power coefficient can be measured with a nacelle anemometer that is near the nacelle and in the near-wake of the rotor. This type of measurement does not typically give a true power coefficient but does give a measurement that is proportional to the actual power coefficient and that is independent of tip-speed-ratio or pitch angle.

At 420, the method 400 continues with changing the original or previous pitch value or setting, $\beta_0$, that is provided in signal 330 to the control system 320 by a pitch increment or delta pitch, $\Delta\beta_1$, to generate a new or adapted pitch value, $\beta_1$, which is sent from the adaptive controller 350 in signal 330 to the control system 320. The control system 320 responds by generating a pitch control signal 338 that is used by the actuators 318 to adjust the pitch of the blades 312. The following equation may be used for generating the pitch increment:

$$\Delta\beta(n) = \gamma_{\Delta\beta} \operatorname{sgn}[\Delta\beta(n-1)] \operatorname{sgn}[P_{favg}(n) - P_{favg}(n-1)] [P_{favg}(n) - P_{favg}(n-1)]^{1/2}$$

where "n" is the step or increment number and $\gamma_{\Delta\beta}$ is a gain. Of course, other processes may be used to select the pitch increment to successfully control pitch angle, but the provided equation is useful for relatively quickly obtaining desired convergence.

At 430, the average power coefficient with the new pitch setting is measured or determined for the adaptation period. At 440, the method 400 continues with determining whether the newly measured average power coefficient is larger than the average power coefficient for the prior adaptation period (i.e., at the prior blade pitch). If the magnitude of the power coefficient is increasing, the next pitch increment or delta pitch will be of the same sign (i.e., another positive increment or step in pitch or another negative positive increment or step in pitch), which is shown at step 460.

At 470, a next or new adapted pitch value, $\beta_2$, is generated by modifying the prior pitch value by the pitch increment having the same sign as the prior increment value. In other words, with increasing power coefficient values, the method 400 continues to change the pitch in the same direction. With reference to the graph 200 of FIG. 2, this process 400 may be visualized as changing the pitch of the blades with increasing power coefficients to try to reach the optimal power capture region 210. At 430, after another adaptation period has elapsed, the average power coefficient (at the newly adapted pitch) is again determined and at 440 is compared to the prior power coefficient (at the prior pitch). By repeating the adaptive process 400, eventually the pitch of the wind turbine controlled by the adaptive pitch control method 400 should converge to a value that results in maximum power capture (e.g., an operating point in region 210 of graph 200 in FIG. 2).

If at 440 the average power coefficient is determined to be decreasing or not to be greater than the average power coefficient of the prior adaptation period, the method 400 continues at 450 with forcing the next pitch increment to have an opposite sign. In other words, if the last pitch change resulted in a lower power coefficient for the wind turbine, the adaptive method 400 acts to move or adjust the pitch of the blades in the opposite direction by increasing or decreasing the pitch of the blades. This increment of opposite sign is then used at 470 to generate a next nominal pitch signal for transmission by signal 330 to the control system 320 (as shown in FIG. 3) for use in adjusting the pitch of the blades 312 via control signal 338 and actuators 318.

As discussed previously, the adaptive method 400 is typically continuously performed for a wind turbine to allow the turbine to adapt to changing operating conditions due to wind changes and/or changes in the physical plant components (such as blade erosion, sensor drift, and the like). However, in some cases, the method 400 may be performed for a particular period of time, such as one week to a month, and values for the pitch setting may be used to provide a relative fixed nominal pitch value (e.g., use the pitch that resulted in the wind turbine operating most consistently in the optimal power coefficient region 210).

By implementing the method 400, the adaptive controller 350 allows the control system 320 to use a control approach or algorithm that generally eliminates the need for prior knowledge of the turbine's performance to achieve improved power capture. This control approach also accommodates slowly changing aerodynamic properties caused by blade erosion and other factors and may be labeled adaptive control. In some embodiments, the pitch control module 356 is configured to operate in conjunction with operation of the torque control module 358.

The torque control module 358 may be configured to provide adaptive torque control similar to the process 400 shown in FIG. 4. In these embodiments, a control algorithm used by the control system 320 may be given by $Q_E = \rho M \Omega^2$. The adaptive gain, M, incorporates all the terms in torque control gain, k, except for the air density, which is time varying and uncontrollable. The adaptive controller 358 functions to provide the adaptive torque gain, M, value to the control system 320 via signal 330 to facilitate its generation of torque control signal 336 that is used in the plant 310 to control the generator 314. The adaptive controller 350 begins by changing the adaptive torque gain by some value or adaptation increment, $\Delta M$, and at the end of an adaptation period, which again may be minutes or hours in length, the controller 350 evaluates the turbine's performance by comparing the average power coefficient for the adaptation period to the average power coefficient for the previous adaptation period (i.e., before the change to the adaptive torque gain). As was the case in pitch control process 400, if the controller 350 determines that the magnitude of the power coefficient is increasing, the next torque gain adaptation increment, $\Delta M$, will be of the same sign (i.e., to continue to increase or to decrease the torque gain value), but if the magnitude is decreasing, the next torque gain increment will be of the opposite sign. Eventually, the torque gain value, M, should pseudo converge at a value that results in maximum power capture (e.g., region 210 of the graph 200 of FIG. 2).

One embodiment for utilizing the adaptive control techniques of the pitch and torque control modules 356, 358 together involves an iterative methodology. In such an iterative approach, the method 400 shown in FIG. 4 may be performed for a preset number of iterations to "converge" upon an optimal pitch for a particular torque gain value. Then, the iterative method of controlling the wind turbine continues with taking a single adaptation step or increment (i.e., single $\Delta M$) in the torque gain, M (either positive or negative depending on the current trajectory toward the optimal region 210 of graph 200). The method 400 is then repeated for the new adapted torque gain value, and when the pitch converges on a new optimal pitch value (nominal pitch), the torque gain is adjusted by another adaptation step. Eventually, both the pitch and the torque gain values should converge to an operating region in which the power is optimal or maximized. This iterative method may be continued for a selected time period or on an ongoing basis (i.e., when the wind turbine is operating). Of course, the process may be reversed to practice this iterative approach, i.e., with the adaptive methodology for torque gain being performed as discussed in the prior paragraph until convergence is achieved followed by taking a single adaptive step in adjusting the pitch of the blades. To determine which direction the single increment step of torque gain, $\Delta M$, or pitch, $\Delta \beta$, should be, the adaptive controller 350 may utilize the average power coefficient data from the last few pitch or torque gain values, respectively (e.g., the last 2 to 10 values or the like in the iteration process 400 for pitch or a similar process (not shown) for torque gain adaptation).

In another embodiment, the adaptive control method utilizes form fitting of data from a predictive model. For example, a curve or function can be fit to predictive data and/or graphs to obtain an expected shape of a peak of determined power coefficient for a wind turbine (i.e., with torque gain, M, versus pitch, $\beta$, or vice versa). In other words, the method of this embodiment involves generating a function of one variable versus the other from predictive data and using that function to change one variable as the other adapts. In some cases, for example, models are performance codes, such as WTPerf or PROP, which are blade-element-momentum models but nearly any performance prediction tool or tool that can be used to predict performance may be used to practice this embodiment. Then, the adaptive controller 350 may operate to run the pitch control module 356 to perform the pitch adaptation method 400 shown in FIG. 4 with the torque gain variable, M, being changed according to the curve or function determined based on the model data (e.g., based on a predicted curve for the wind turbine). In other embodiments, the adaptive controller 350 instead runs the torque control module 358 to perform the described torque gain adaptation method to adjust the torque gain value, M, while the pitch, $\beta$, is changed incrementally according to the predictive curve or function.

In other embodiments, the pitch control module 356 and the torque control module 358 are run sequentially or serially to provide the signal 330. For example, the pitch may be adapted with method 400 by running the pitch control module 356 until "convergence" is achieved, and then with this pitch value, the torque control module 358 may be run to adaptively control the torque gain until convergence is achieved for the torque gain value. When a next adaptation increment is reached or has lapsed, the two modules may be run again sequentially. Of course, this process may be performed in the opposite order by first running the torque control module 358 and then running the pitch control module 356 with the particular torque gain value. Convergence may, for example but not as a limitation, be defined as a point when the change in pitch or torque constant is relatively small (i.e., within a predefined bound/limit or value range) in a previous number of iterations or steps (e.g., such as change was within an acceptable range over the prior 3 to 7 steps (or other number of steps)).

Although the above discussion includes descriptions and illustration with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. It is therefore intended that the following appended claims and claims hereafter introduced are interpreted to include modifications, permutations, additions, and sub-combinations to the exemplary aspects and embodiments discussed above as are within their true spirit and scope.

The invention claimed is:

1. An adaptive control method for use with wind turbines to better capture available wind power, comprising:
   for a wind turbine operating with a first pitch angle, determining captured power for a first adaptation time period;
   determining wind power available for the wind turbine for the first time period;
   determining a power coefficient for the first adaptation time period based on a ratio of the captured power to the available wind power;
   generating a pitch signal for use in setting a second pitch angle of blades in the wind turbine by modifying the first pitch angle by a pitch increment;
   determining captured power and wind power available for a second adaptation time period;
   determining a power coefficient for the second adaptation time period based on ratio of the captured power to the available wind power for the second adaptation time period;
   comparing the power coefficients for the first and second adaptation time periods; and
   based on the comparing, generating a pitch signal for use in setting a third pitch angle of the blades in the wind turbine by modifying the second pitch angle of the blades by the pitch increment.

2. The method of claim 1, wherein the determining of the captured power and the available wind power for the first and second adaptation time periods comprises determining average captured power and available wind power, respectively, for each of the time periods.

3. The method of claim 1, wherein the comparing comprises determining whether the power coefficient from the second adaptation time period is larger than the power coefficient from the first adaptation time period and wherein the generating the pitch signal for use in setting the third pitch angle comprises, prior to the modifying, retaining a sign of the pitch increment when the power coefficient of the second adaptation time period is determined larger and changing the sign of the pitch increment when the power coefficient of the second adaptation time period is not determined to be larger.

4. The method of claim 1, repeating the determining of the captured power and wind power available, the determining of the power coefficient, the comparing of the power coefficients, and the generating of the pitch signal for setting the third pitch angle for additional adaptation time periods.

5. The method of claim 1, further comprising generating pitch control signals based on the first generated pitch signal and the second generated pitch signal and transmitting the pitch control signals to a pitch actuator responsive to set the pitch angle of the blades based on the pitch control signals.

6. The method of claim 1, further comprising determining a function of torque gain relative to pitch angle using predictive data for the wind turbine and modifying an existing torque gain value based on the determined function.

7. The method of claim 1, further comprising after the second generating of the pitch signal, making an incremental change to an existing torque gain value for the wind turbine with direction of the incremental change being selected based on the determined power coefficients.

8. An adaptive controller for variable speed wind turbines, comprising:
   means for determining a pitch angle setting for blades of a wind turbine;
   means for determining a first power coefficient for the wind turbine;
   means for first incrementing the pitch angle setting by a first value of pitch increment generated based on the first power coefficient;
   means for determining a second power coefficient for the wind turbine after expiration of an adaptation time period;
   means for second incrementing the pitch angle setting by setting a second value of pitch increment generated based on the second power coefficient; and
   means for repeating the determining of the second power coefficient and the second incrementing of the pitch angle setting.

9. The controller of claim 8, further comprising means for incrementing a torque gain for the wind turbine adaptively based on power coefficient measurements for the wind turbine.

10. The controller of claim 8, wherein the first power coefficient is a ratio of an average captured power over an adaptation time period preceding the expired adaptation time period to an average wind power available over the adaptation time period preceding the expired adaptation time period and wherein the second power coefficient is a ratio of an average captured power over the expired adaptation time period to an average wind power available over the expired adaptation time period.

11. The controller of claim 10, wherein the means for second incrementing the pitch angle setting selects a sign for a pitch incrementing value based on whether the second power coefficient is greater than the first power coefficient.

12. A method of adaptively adjusting pitch angles of blades in a variable speed wind turbine, comprising:
   determining average power coefficients for a first period of operation for the wind turbine and for a second period of operation after the first period;
   when the average power coefficient for the second time period is larger than the average power coefficient for the first time period, adding a pitch increment having a same sign as a prior pitch increment to a nominal pitch angle value for the wind turbine;
   when the average power coefficient for the second time period is less than the average power coefficient for the first time period, adding a pitch increment having an opposite sign as the prior pitch increment from the nominal pitch angle value for the wind turbine; and
   repeating the determining, the adding of the pitch increment of the same sign, and the adding of the pitch increment of the opposite sign to adaptively adjust pitch angle of blades in the wind turbine.

13. The method of claim 12, wherein the average power coefficients are determined as a ratio of average power captured by the wind turbine during a respective one of the periods to average available wind power at the wind turbine during the same respective one of the periods and wherein the second period is the period of operation immediately after the first period of operation.

14. The method of claim 12, further comprising determining a function defining change of torque gain relative to blade pitch angle based on modeled operating data for the wind turbine and changing the torque gain based on the determined function using the nominal pitch angle value after the adding of the pitch increment of the opposite sign.

15. The method of claim 12, further comprising incrementing a torque gain value a predefined amount, wherein the incrementing is performed in a positive or negative direction based on a comparison of the average power coefficients.

16. The method of claim 12, wherein the first and second time periods have equal length that is selected from the range of 1 hour to 100 hours.

17. A controller for a variable speed wind turbine configured to perform the adaptive pitch angle adjustment method of claim 12.

* * * * *